United States Patent
Xie et al.

(10) Patent No.: US 12,054,412 B1
(45) Date of Patent: Aug. 6, 2024

(54) WATER-BLOCKING AIR-PERMEABLE MODULAR CONSTRUCTED WETLAND CAPABLE OF AERATING INTERMITTENTLY

(71) Applicant: Anhui Jianzhu University, Hefei (CN)

(72) Inventors: Fazhi Xie, Hefei (CN); Jiwei Zhou, Hefei (CN); Hao Hu, Hefei (CN); Yun Liu, Hefei (CN); Yulin Song, Hefei (CN); Wanrong Xu, Hefei (CN); Rongrong Chen, Hefei (CN); Zhongwen Li, Hefei (CN); Qingwei Zeng, Hefei (CN); Xumei Li, Hefei (CN); Jiajin Zhao, Hefei (CN)

(73) Assignee: Anhui Jianzhu University, Hefei (CN)

( * ) Notice: Subject to any disclaimer, the term of this patent is extended or adjusted under 35 U.S.C. 154(b) by 0 days.

(21) Appl. No.: 18/467,058

(22) Filed: Sep. 14, 2023

Related U.S. Application Data

(63) Continuation of application No. PCT/CN2023/101444, filed on Jun. 20, 2023.

Foreign Application Priority Data

May 24, 2023 (CN) .......................... 202310614606.3

(51) Int. Cl.
*C02F 3/32* (2023.01)
*C02F 3/30* (2023.01)
(Continued)

(52) U.S. Cl.
CPC .............. *C02F 3/327* (2013.01); *C02F 3/301* (2013.01); *C02F 2101/105* (2013.01); *C02F 2101/16* (2013.01); *C02F 2203/006* (2013.01)

(58) Field of Classification Search
CPC .... C02F 3/327; C02F 3/301; C02F 2101/105; C02F 2101/16; C02F 2203/006
(Continued)

(56) References Cited

U.S. PATENT DOCUMENTS

| | | | |
|---|---|---|---|
| 5,893,975 A * | 4/1999 | Eifert ...................... | C02F 3/327 210/150 |
| 2004/0173523 A1* | 9/2004 | Beaulieu ................... | C02F 3/00 210/151 |

FOREIGN PATENT DOCUMENTS

| | | |
|---|---|---|
| CN | 102603077 A | 7/2012 |
| CN | 102923857 A | 2/2013 |

(Continued)

OTHER PUBLICATIONS

Machine-generated English translation of CN 218320996, generated on Feb. 6, 2024.*

(Continued)

*Primary Examiner* — Fred Prince
(74) *Attorney, Agent, or Firm* — Westbridge IP LLC

(57) ABSTRACT

A water-blocking air-permeable modular constructed wetland capable of aerating intermittently includes an aerobic reaction zone, an anoxic reaction zone, a soil plant zone and an aeration pipe; and the aerobic reaction zone, the anoxic reaction zone and the soil plant zone are communicated in turn along a bottom-up water discharging direction, the aerobic reaction zone includes an air-permeable water-blocking layer and an air-insulating layer that are arranged at interval from inside to outside, and an aeration port of the aeration pipe is located in a cavity, enclosed by the air-permeable water-blocking layer and the air-insulating layer.

9 Claims, 10 Drawing Sheets

(51) Int. Cl.
    *C02F 101/10* (2006.01)
    *C02F 101/16* (2006.01)
(58) Field of Classification Search
    USPC ....... 210/602, 605, 617, 620, 630, 150, 151, 210/903
    See application file for complete search history.

(56) References Cited

FOREIGN PATENT DOCUMENTS

| | | | |
|---|---|---|---|
| CN | 104512967 A | * | 4/2015 |
| CN | 109336268 A | | 2/2019 |
| CN | 209352730 U | | 9/2019 |
| CN | 113636711 A | * | 11/2021 |
| CN | 214611752 U | | 11/2021 |
| CN | 218320996 U | * | 1/2023 |
| KR | 100945046 B1 | | 3/2010 |

OTHER PUBLICATIONS

Machine-generated English translation of CN 104512967, generated on Feb. 6, 2024.*
Machine-generated English translation of CN 113663711, generated on Feb. 6, 2024.*
First Office Action issued in counterpart Chinese Patent Application No. 202310614606.3, dated Sep. 28, 2023.
Wang et al., Effect of Intermittent Aeration on Nitrogen Removal Efficiency in Vertical Subsurface Flow Constructed Wetland, Environmental Science, 2016, 37(3), pp. 980-987, dated Mar. 31, 2016.

* cited by examiner

WATER-BLOCKING AIR-PERMEABLE MODULAR CONSTRUCTED WETLAND CAPABLE OF AERATING INTERMITTENTLY

CROSS-REFERENCE TO RELATED APPLICATIONS

This application is a continuation of International Application No. PCT/CN2023/101444, filed on Jun. 20, 2023, which claims priority to Chinese Patent Application No. 202310614606.3, filed on May 24, 2023. All of the aforementioned applications are incorporated herein by reference in their entireties.

TECHNICAL FIELD

The present disclosure relates to the technical field of constructed wetlands, and in particular to a water-blocking air-permeable modular constructed wetland capable of aerating intermittently.

BACKGROUND

The constructed wetland is a novel sewage disposal technology raised in 1970s. It is the technology to dispose the sewage and sludge mainly using the physical, chemical, biological triple synergy of soil, artificial medium, plant and microorganism when the sewage and sludge are distributed to the artificially constructed wetland with control and flow along a certain direction, and therefore this technology is widely applied in sewage disposal of small towns and rural areas.

At present, the constructed wetland achieves the removal of nitrogen pollutants in the sewage mainly through the nitrification and denitrification of the microorganism in a filling matrix, a nitration reaction requires an aerobic environment while a denitrification reaction requires an anoxic environment or an oxygen-free environment, but most of the existing wetlands are hard to form aerobic zones with higher dissolved oxygen, and other reactions capable of removing organic matters will occur in the wetland due to existing other aerobic and heterotrophic bacteria therein, making a poor nitration reaction of mainly removing nitrogen, and a low reaction rate. Other aerobic and heterotrophic bacteria also occur other poor reactions for removing the organic matters, resulting that both organic matter removal and denitrification effects are poor.

SUMMARY

The technical problem to be solved by the present disclosure is to provide a water-blocking air-permeable modular constructed wetland capable of aerating intermittently, with clear aerobic and anoxic zones.

In order to solve the above-mentioned technical problem, the present disclosure adopts the following technical solution: a water-blocking air-permeable modular constructed wetland capable of aerating intermittently, including an aerobic reaction zone, an anoxic reaction zone, a soil plant zone and an aeration pipe; and the aerobic reaction zone, the anoxic reaction zone and the soil plant zone are communicated in turn along a bottom-up water discharging direction, the aerobic reaction zone includes an air-permeable water-blocking layer and an air-insulating layer that are arranged at interval from inside to outside, and an aeration port of the aeration pipe is located in a cavity, enclosed by the air-permeable water-blocking layer and the air-insulating layer.

Further, the water-blocking air-permeable modular constructed wetland capable of aerating intermittently also includes a module frame and a water inlet pipe worn on the module frame, the aerobic reaction zone further includes a first material box which is arranged at an interval with the module frame and communicated with the water inlet pipe, the aeration pipe is worn on the module frame and the aeration port is located at a gap position between the module frame and the first material box, the air-permeable water-blocking layer is arranged on the first material box, and the air-insulating layer is arranged on the module frame.

Further, the anoxic reaction zone at least includes a second material box, the soil plant area at least includes a third material box, both the second material box and the third material box may be detachably connected with the module frame along a vertical direction, and the second material box may be in sliding and sealing connection with the first material box and the third material box along a horizontal direction.

Further, the water inlet pipe is provided with at least four main water inlet pipe orifices, all of which are uniformly worn on four sides of the module frame.

Further, the aeration pipe is provided with at least four main air inlet pipe orifices, all of which are uniformly worn on the four sides of the module frame.

Further, upper and lower sides of the second material box are respectively provided with a first flange and a second flange along a vertical direction, and the first flange may be in sliding and sealing connection with the second material box along a horizontal direction; and a first groove body and a second groove body, which are in sealing and plugging fit with the first flange and the second flange, are respectively arranged on the third material box and the first material box, and the second groove body may be in sliding and sealing connection with the first material box along a horizontal direction.

Further, two sides of the module frame are also provided with a limiting chute in respective along a vertical direction, threaded rods are also rotationally arranged in the limiting chutes, each threaded rod is also in threaded connection with two sliders, and the two sliders are also slidingly connected with groove walls of the limiting chutes in respective; left and right sides of the second material box are also provided with a first chute in respective along a horizontal direction, first protrusions capable of sliding in the two limiting chutes are slidingly arranged in the two first chutes in respective, the first protrusions may enable the threaded rods and the sliders, located above, to pass, and the first protrusions may also be propped to top ends of the sliders, located below; and two sides of the third material box are also provided with second protrusions capable of sliding in the two limiting chutes in respective, and the second protrusions may enable the threaded rods to pass and be propped to top ends of the sliders, located above.

Further, each first protrusion includes a block body, a sliding pole slidingly worn on the block body along a vertical direction, two inserting blocks slidingly worn on the block body along a horizontal direction in respective, a driving block arranged on the sliding pole and capable of controlling the two inserting blocks to slide synchronously along the same direction, and a spring wound on the sliding pole and capable of resetting the sliding pole; and slots capable of being in plugging fit with the inserting blocks are formed in the groove walls of the first chutes and the limiting chutes in respective, and the sliding pole may also be propped to the second protrusions.

Further, a cross section of the driving block is a parallelogram, one side of each of the two inserting blocks is inclined and in contact with the two inclined faces of the driving block in respective, and the two inserting blocks are also slidingly hinged with the driving block in respective through a linkage.

Further, an electric machine with an output end connected with one threaded rod is also arranged in the module frame, and both threaded rods are provided with pulleys, between which a belt is also connected.

The beneficial effects of the present disclosure are reflected as follows.

The water-blocking air-permeable modular constructed wetland capable of aerating intermittently in embodiments of the present disclosure is provided with the aerobic reaction zone, the anoxic reaction zone, the soil plant zone and the aeration pipe, the aerobic reaction zone includes the air-permeable water-blocking layer and the air-insulating layer that are arranged at interval from inside to outside, and the aeration port of the aeration pipe is located in the cavity, enclosed by the air-permeable water-blocking layer and the air-insulating layer.

The aerobic reaction zone is aerated and supplied with oxygen through the aeration pipe, such that the dissolved oxygen in the aerobic reaction zone is sufficient. The clear aerobic reaction zone is formed to occur the nitration reaction and occur other reactions for removing the organic matters of other aerobic and heterotrophic bacteria, enhancing the effect of the nitration reaction provides the denitrification reaction with sufficient nitrogen source to occur the denitrification reaction, and the oxygen entry into the anoxic reaction zone caused by the excess oxygen is prevented by controlling the aeration pipe to aerate intermittently and controlling the aeration time, and the clear anoxic reaction zone is formed, avoiding enhancing the denitrification reaction while inhibiting the denitrification reaction by the excess dissolved oxygen, thereby enhancing the nitrogen removal effect.

By setting the air-permeable water-blocking layer and the air-insulating layer, the oxygen, clamped between the two layers and generated by the aeration pipe, and the sewage in the aerobic reaction zone are locked, which further enhances the nitration reaction of the sewage in the aerobic reaction zone and other reactions for removing the organic matters.

The concentration of the nitrogen pollutant in the sewage is reduced by enhancing the nitration reaction, other reactions for removing the organic matters of other aerobic and heterotrophic bacteria and the denitrification reaction, so a situation that the plant root in the wetland is rot, caused by the higher concentration of the nitrogen pollutant in the sewage, is avoided, that is, the activity of the plant root is enhanced. Since the plant root may absorb and assimilate a part of nitrogen pollutant, the phosphorous removal effect is also enhanced.

The nitration reaction, denitrification reaction and plant purification are implemented orderly and in turn by setting the bottom-up water discharge, to ensure that each zone may be completely covered by the sewage for reaction, thereby improving the wetland utilization rate.

DETAILED DESCRIPTION OF THE EMBODIMENTS

Figure 1:
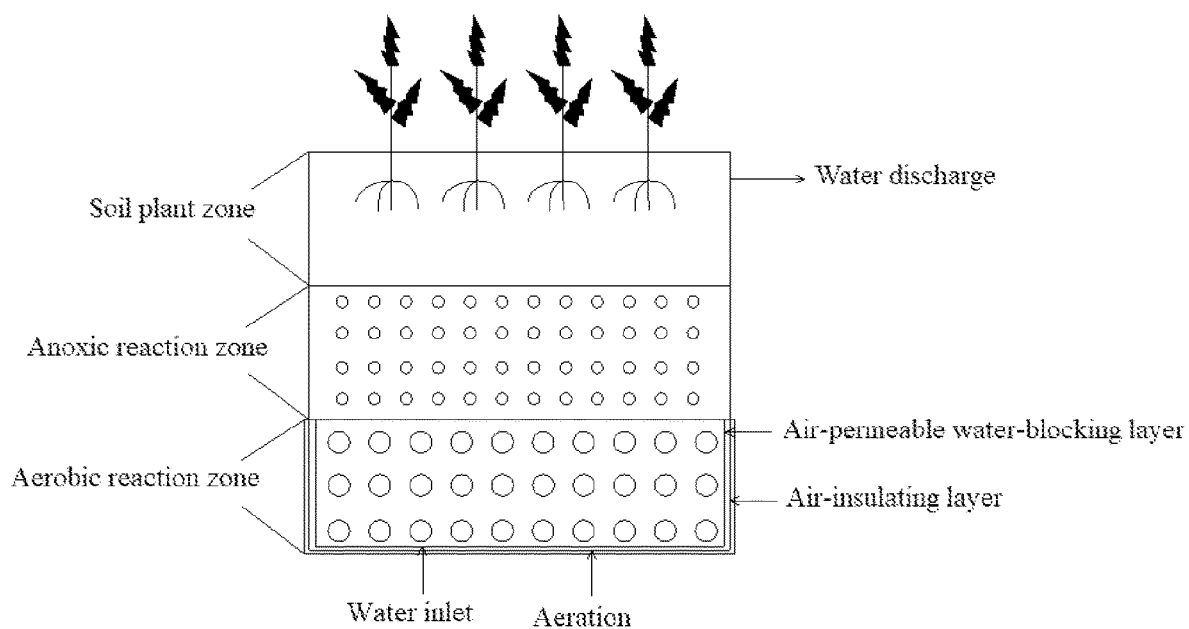
FIG. 1 is a diagram of a composition of a water-blocking air-permeable modular constructed wetland capable of aerating intermittently in embodiments of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure.

It is to be noted that if directional indication, such as: upper, lower, left, right, front, rear, etc. is involved in the embodiments of the present disclosure, the directional indication is merely used to explain the relative position relation, movement and the like of various components under a certain special posture (as shown in the drawings); and if the special posture is changed, the directional indication will change accordingly.

In addition, if the descriptions "first", "second" and the like are involved in the embodiments of the present disclosure, the descriptions "first", "second" and the like are merely used for description, instead of being understood as indicating or implying relative importance or impliedly indicating the quantity of the showed technical features. Thus, the features defined with "first" and "second" may expressly or impliedly one or more features. In addition, "a plurality of" means two or above two. Thus, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

Figure 2:
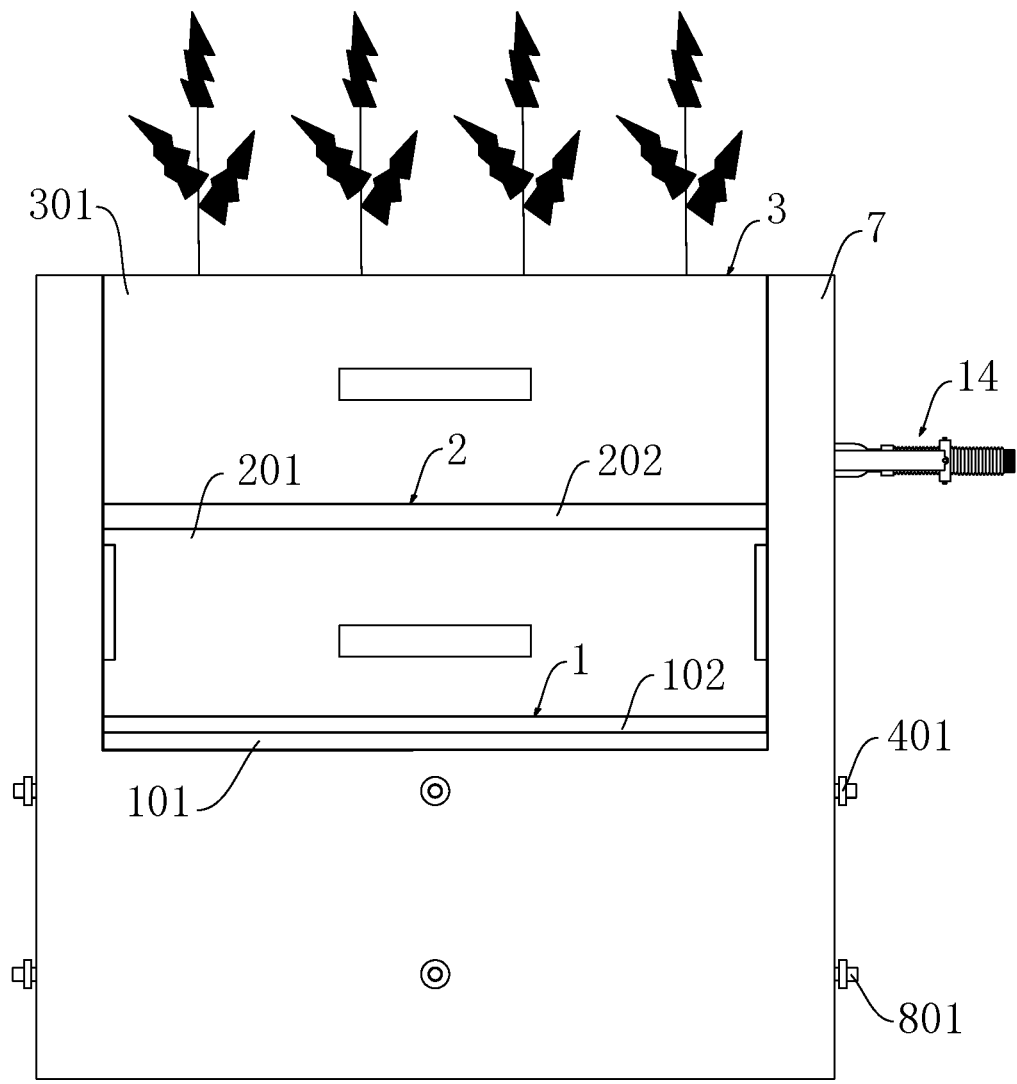
FIG. 2 is a structural front view of a water-blocking air-permeable modular constructed wetland capable of aerating intermittently in embodiments of the present disclosure.
Figure 3:
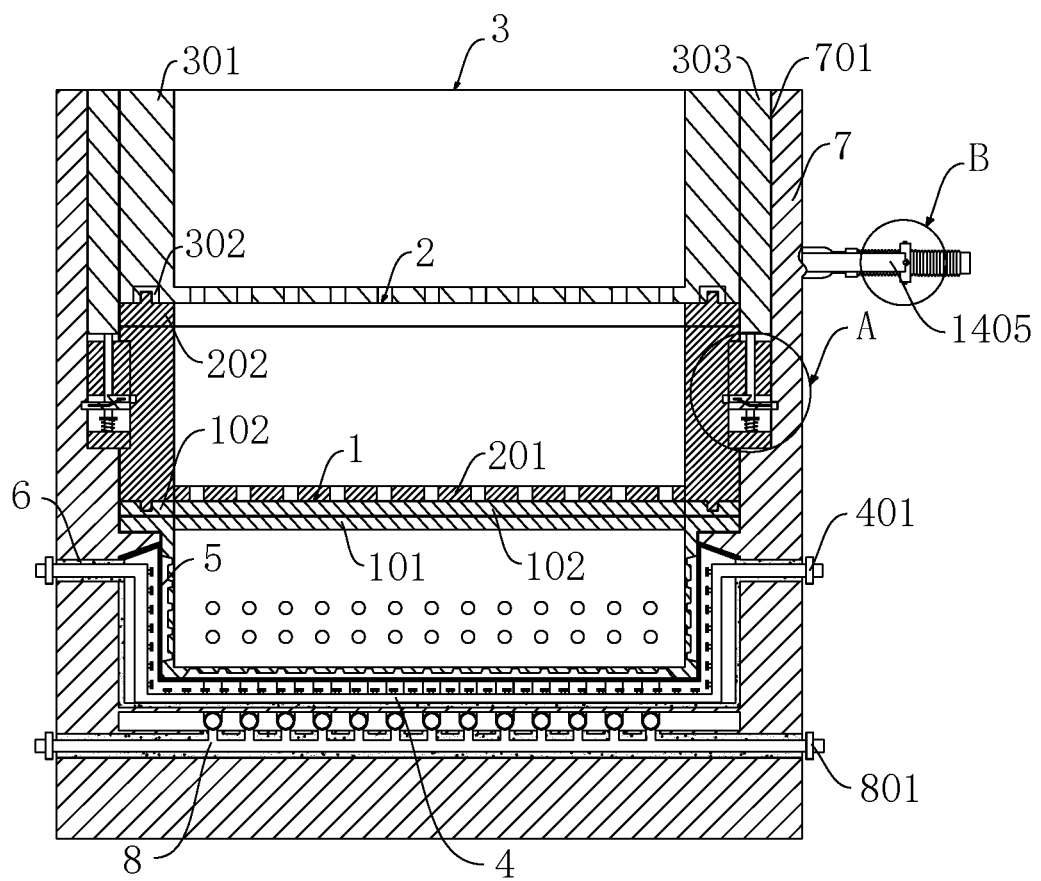
FIG. 3 is structural front section view of a water-blocking air-permeable modular constructed wetland capable of aerating intermittently in embodiments of the present disclosure.
Figure 4:
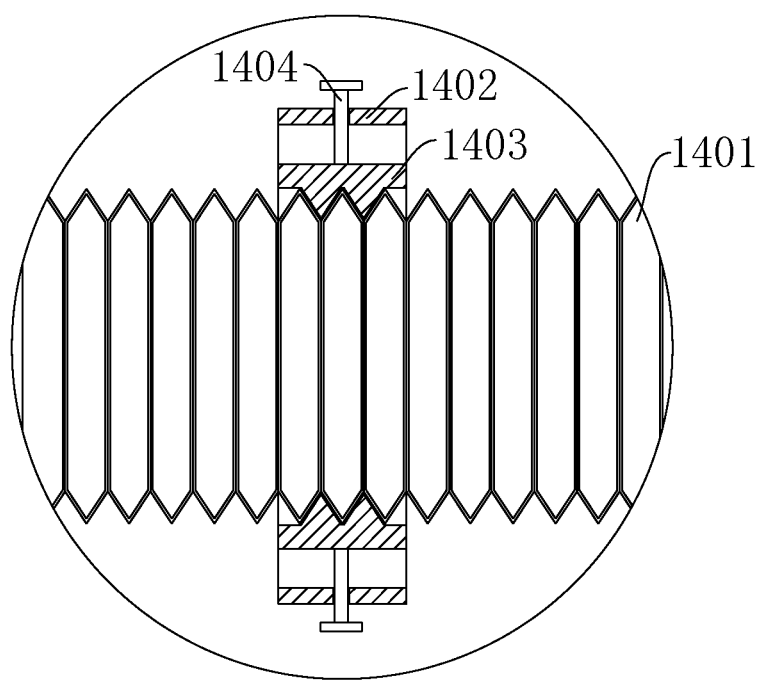
FIG. 4 is an enlarged view of a part A in FIG. 3.
Figure 5:
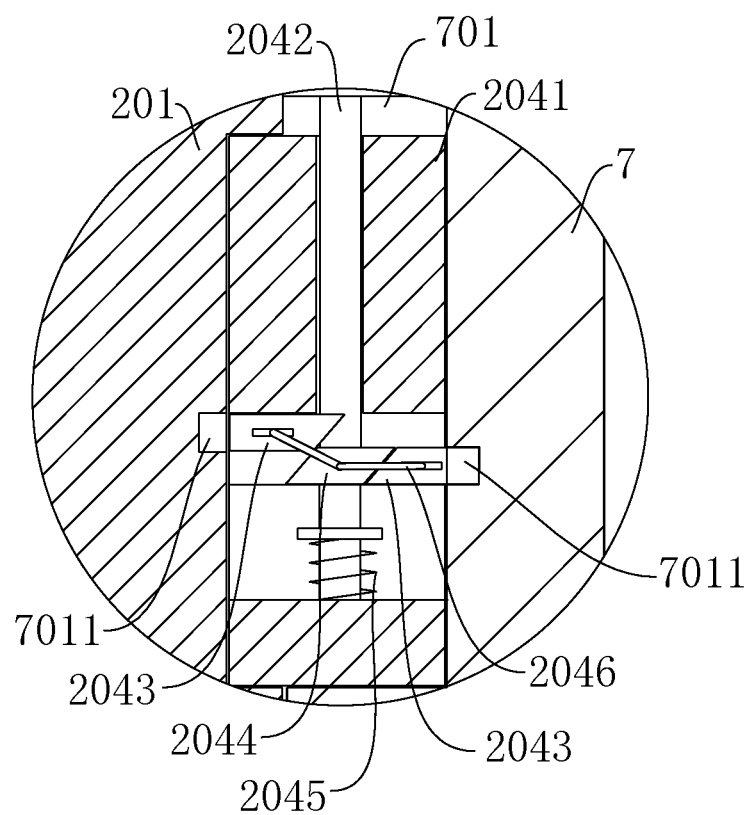
FIG. 5 is an enlarged section view of a part B in FIG. 3.
Figure 6:
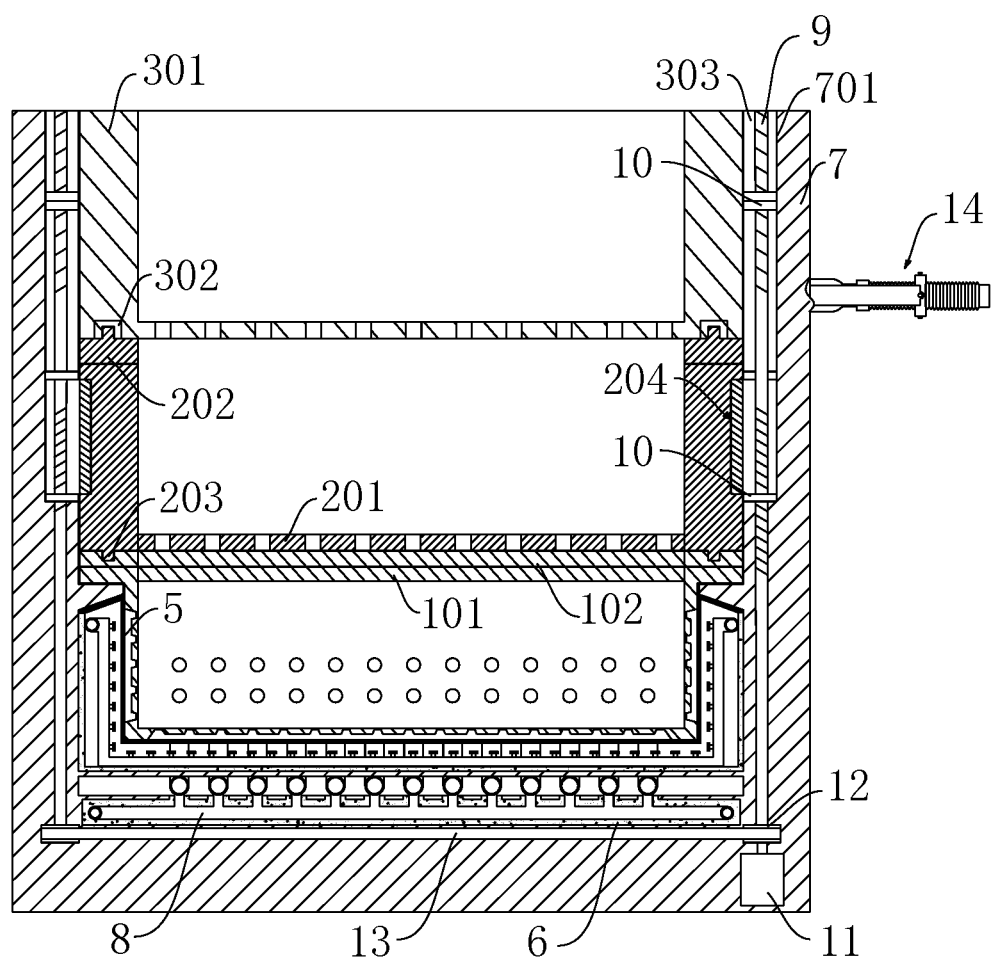
FIG. 6 is structural front section view of a water-blocking air-permeable modular constructed wetland capable of aerating intermittently in embodiments of the present disclosure.
Figure 7:
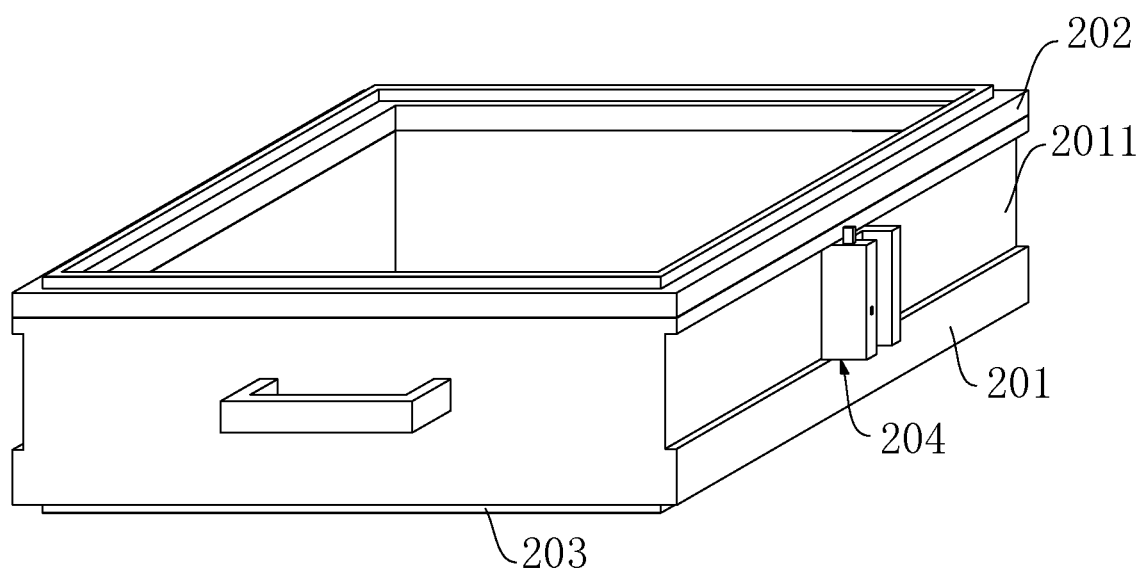
FIG. 7 is a structural diagram of a second material box in embodiments of the present disclosure.
Figure 8:
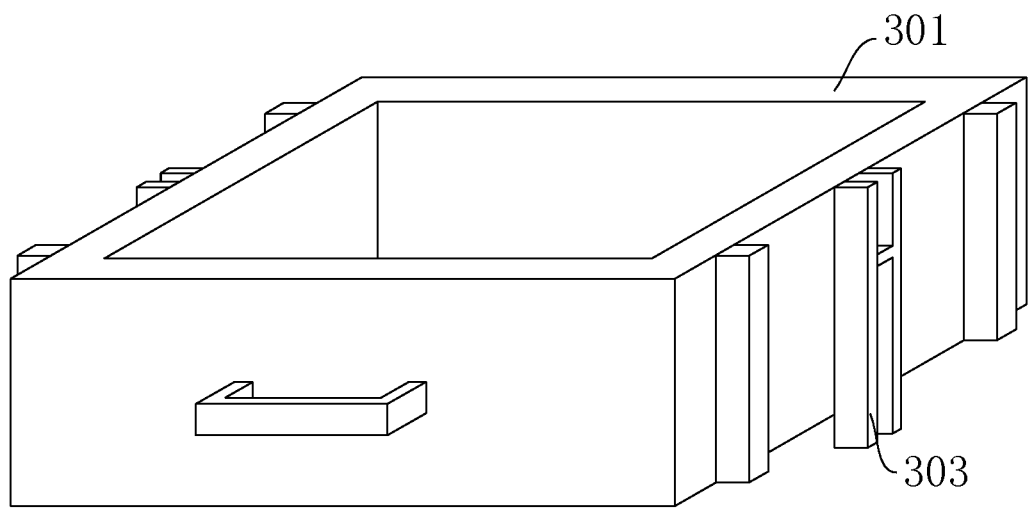
FIG. 8 is a structural diagram of a third material box in embodiments of the present disclosure.
Figure 9:
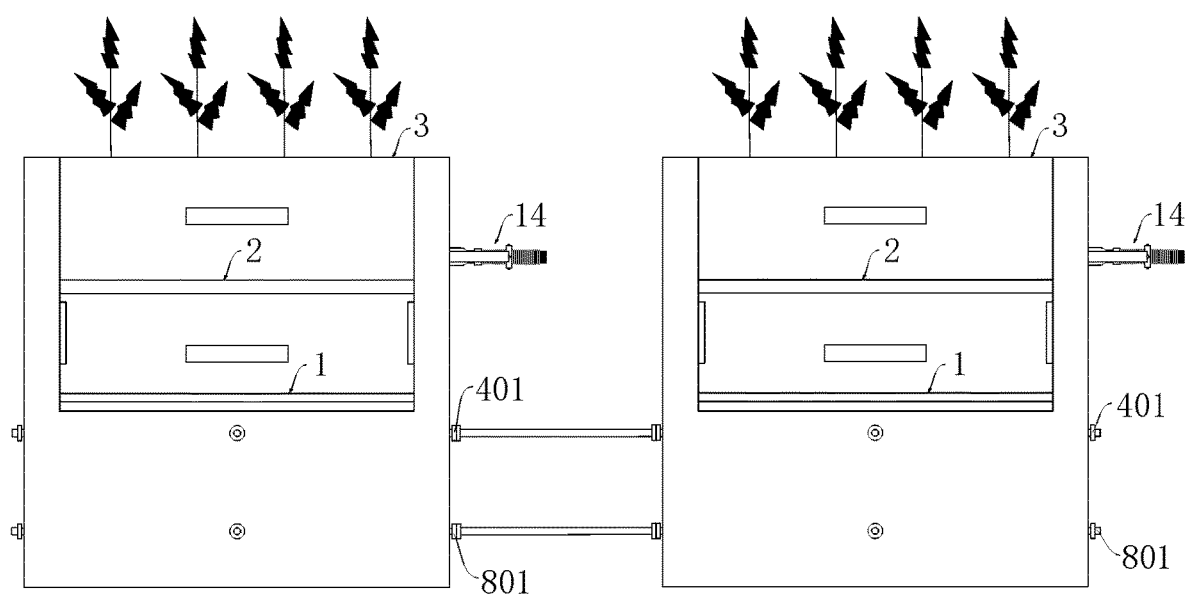
FIG. 9 is a structural front view of a combined using state of a water-blocking air-permeable modular constructed wetland capable of aerating intermittently in embodiments of the present disclosure.
Figure 10:
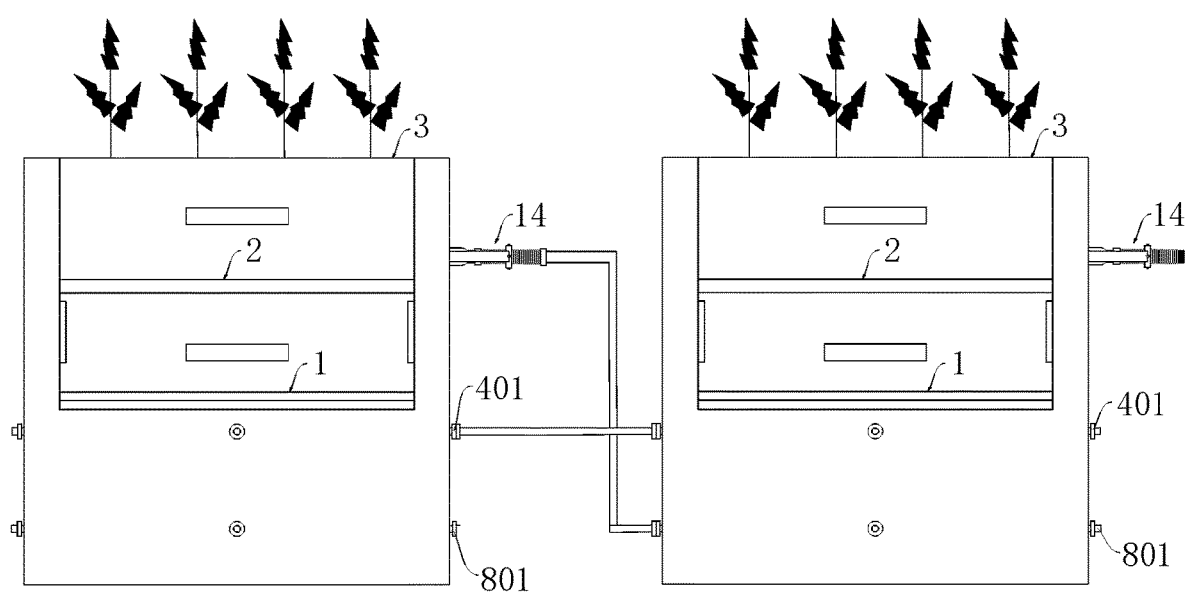
FIG. 10 is a structural front view of another combined using state of a water-blocking air-permeable modular constructed wetland capable of aerating intermittently in embodiments of the present disclosure.

Referring to FIG. 1 to FIG. 10, a water-blocking air-permeable modular constructed wetland capable of aerating intermittently provided by the present disclosure includes an aerobic reaction zone 1, an anoxic reaction zone 2, a soil plant zone 3 and an aeration pipe 4; and the aerobic reaction zone 1, the anoxic reaction zone 2 and the soil plant zone 3 are communicated in turn along a bottom-up water discharging direction, the aerobic reaction zone 1 includes an air-permeable water-blocking layer 5 and an air-insulating layer 6 that are arranged at interval from inside to outside, and an aeration port of the aeration pipe 4 is located in a cavity, enclosed by the air-permeable water-blocking layer 5 and the air-insulating layer 6.

The water-blocking air-permeable modular constructed wetland capable of aerating intermittently provided by embodiments of the present disclosure is provided with the aerobic reaction zone 1, the anoxic reaction zone 2, the soil plant zone 3 and the aeration pipe 4; and the aerobic reaction zone 1 includes the air-permeable water-blocking layer 5 and the air-insulating layer 6 that are arranged at interval from inside to outside, and the aeration port of the aeration pipe 4 is located in the cavity, enclosed by the air-permeable water-blocking layer 5 and the air-insulating layer 6.

The aerobic reaction zone 1 is aerated and supplied with oxygen through the aeration pipe 4, such that the dissolved oxygen in the aerobic reaction zone 1 is sufficient. The clear aerobic reaction zone is formed to occur the nitration reaction and occur other reactions for removing the organic matters of other aerobic and heterotrophic bacteria, enhancing the effect of the nitration reaction provides the denitrification reaction with sufficient nitrogen source to occur the denitrification reaction, and the oxygen entry into the anoxic reaction zone 2 caused by the excess oxygen is prevented by controlling the aeration pipe 4 to aerate intermittently and controlling the aeration time, and the clear anoxic reaction zone 2 is formed, avoiding enhancing the denitrification reaction while inhibiting the denitrification reaction by the excess dissolved oxygen, thereby enhancing the nitrogen removal effect.

By setting the air-permeable water-blocking layer 5 and the air-insulating layer 6, the oxygen, clamped between the two layers and generated by the aeration pipe 4, and the sewage in the aerobic reaction zone are locked, which further enhances the nitration reaction of the sewage in the aerobic reaction zone 1 and other reactions for removing the organic matters.

The concentration of the nitrogen pollutant in the sewage is reduced by enhancing the nitration reaction, other reactions for removing the organic matters of other aerobic and heterotrophic bacteria and the denitrification reaction, so a situation that the plant root in the wetland is rot, caused by the higher concentration of the nitrogen pollutant in the sewage, is avoided, that is, the activity of the plant root is enhanced. Since the plant root may absorb and assimilate a part of nitrogen pollutant, the phosphorous removal effect is also enhanced.

The nitration reaction, denitrification reaction and plant purification are implemented orderly and in turn by setting the bottom-up water discharge, to ensure that each zone may be completely covered by the sewage for reaction, thereby improving the wetland utilization rate.

And in the present disclosure, all of the aerobic reaction zone 1, the anoxic reaction zone 2 and the soil plant zone 3 are a structure with a grid-shaped bottom and an opened top, and an aeration period is stopping aeration for 1 h when aerating for 5 h, with four periods in one day.

And in this embodiment: A rural fecal sewage (as shown in Table 1) is prepared and disposed using the device in the present disclosure, and compared with the constructed wetland for disposing the sewage from top to bottom, the ordinary constructed wetland without aerating is used to run for 30 days in order to determine COD (Chemical Oxygen Demand), nitrogen, phosphorus and other indicators (as shown in Table 2).

TABLE 1 composition table of rural fecal sewage

| Indicator | COD | $NH_3$—N (Ammonia Nitrogen Content Index) | TN (Total Nitrogen) | TP (Total Phosphorus) |
|---|---|---|---|---|
| Concentration (mg/L) | 250. | 25. | 30. | 6. |

TABLE 2 effect comparison of different operations

| Operation group | rate Removal | | | |
|---|---|---|---|---|
| | COD | $NH_3$—N | TN | TP |
| Embodiment | 90% | 95% | 85% | 70% |
| Comparative example | 60% | 55% | 45% | 57% |

Rural washing, rinsing and other sewage (as shown in Table 3) is prepared and disposed using the device in the present disclosure, and compared with the constructed wetland for disposing the sewage from top to bottom, the ordinary constructed wetland without aerating is used to run for 30 days in order to determine COD, nitrogen, phosphorus and other indicators (as shown in Table 4).

TABLE 3 composition table of rural fecal sewage

| Indicator | COD | $NH_3$—N | TN | TP |
|---|---|---|---|---|
| Concentration (mg/L) | 150. | 10. | 15. | 3. |

TABLE 4 effect comparison of different operations

| Operation group | rate Removal | | | |
|---|---|---|---|---|
| | COD | $NH_3$—N | TN | TP |
| Embodiment | 87% | 90% | 80% | 65% |
| Comparative example | 61% | 50% | 41% | 55% |

In one embodiment, further including a module frame 7 and a water inlet pipe 8 worn on the module frame 7, the aerobic reaction zone 1 further includes a first material box 101 which is arranged at an interval with the module frame 7 and communicated with the water inlet pipe 8, the aeration pipe 4 is worn on the module frame 7 and the aeration port is located at a gap position between the module frame 7 and the first material box 101, the air-permeable water-blocking layer 5 is arranged on the first material box 101, and the air-insulating layer 6 is arranged on the module frame 7. In this embodiment, the air-insulating layer 6 is arranged on an inner wall of the module frame 7 and a position where the module frame 7 is worn correspondingly to the aeration pipe 4 and the water inlet pipe 8, the air-permeable water-blocking layer 5 is either arranged on an inner wall or an outer wall of the first material box 101, and the air-permeable water-blocking layer 5 may adopt an air-permeable water-blocking film while the air-insulating layer 6 adopts an air-blocking film, to ensure that the gas of the aeration pipe 4 is completely inside the first material box 101, at the gap position of the module frame 7 and inside the first material box 101. The aeration pipe 4 aerates three sides at the bottom of the first material box 101, and two sides at the bottom of the first material box 101 are subjected to water inlet through the water inlet pipe 8.

And in this embodiment, the aerobic reaction zone 1 further includes coarse particles arranged in the first material box 101, and the coarse particles have a diameter range of 5 cm-10 cm. And in this embodiment, the type of the coarse particles may be selected from the coarse particles used in the existing constructed wetland, including macadams, gravels and volcanics, which have a certain mechanical strength, a large specific surface area, a suitable porosity and an excellent biological and chemical stability, and filling of mixed types and filling of a single type may be carried out during specific filling.

In one embodiment, the anoxic reaction zone 2 at least includes a second material box 201, the soil plant area 3 at least includes a third material box 301, both the second material box 201 and the third material box 301 may be detachably connected with the module frame 7 along a vertical direction, and the second material box 201 may be in sliding and sealing connection with the first material box 101 and the third material box 301 along a horizontal direction. Such a design implements the wetland modularization, the detachable installation, convenient installation and processes mobility. When the wetland is blocked, the second material box 201 and the first material box 101 may be exposed outside by sliding the second material box 201 along the horizontal direction, in order to conveniently clean the filling inside therein, and the cleaning of the filling in the third material box 301 may be directly implemented from the top thereof.

And in this embodiment, the anoxic reaction zone 2 further includes fine particles arranged in the second material box 201, and the fine particles have a diameter range of 1 cm-5 cm. The specific type of the fine particles may be selected from the fine particles used in the existing constructed wetland, including ceramsite, zeolite and steel slags, which have a certain mechanical strength and a suitable porosity, and filling of mixed types and filling of a single type may be carried out during specific filling.

And in this embodiment, the soil plant zone 3 further includes soil and plants that are arranged in the third material box 301, the soil and the specific type of the soil and the plants are the soil and plants used in the existing constructed wetland, and the specific plants may be selected from aquatic plants with developed root systems and stronger vitality, such as reeds, *canna* and bulrush, etc.

In one embodiment, the water inlet pipe 8 is provided with at least four main water inlet pipe orifices 801, all of which are uniformly worn on four sides of the module frame 7. Such a design implements the use of the single constructed wetland in the present disclosure or the combined use of a plurality of constructed wetlands, which are mutually spiced through the main water inlet pipe orifices 801.

In one embodiment, the aeration pipe 4 is provided with at least four main air inlet pipe orifices 401, all of which are uniformly worn on the four sides of the module frame 7. Such a design implements the use of the single constructed wetland in the present disclosure or the combined use of a plurality of constructed wetlands, which are mutually spiced through the main air inlet pipe orifices 401.

In one embodiment, further including a water outlet pipe assembly 14 communicating with the third material box 301, the water outlet pipe assembly 14 includes a corrugated pipe 1401 which is detachably connected with the third material box 301, and a fixing member which is arranged on the corrugated pipe 1401 and used for rotating and fixing a water outlet direction of the corrugated pipe 1401. Such a design implements an adjustable water outlet level of the corrugated pipe 1401 in a manner that the water outlet direction of the corrugated pipe 1401 is adjusted by rotating the fixing member, and at the initial period of using the wetland, a lower water level may be adjusted for water discharge, which is convenient for the root system growth of the plants.

In one embodiment, the fixing member includes a support frame 1405 arranged on the third material box 301, a fixing ring 1402 rotationally arranged on the support frame 1405, at least two bolts 1404 in threaded connection with the fixing ring 1402, and a clamping block 1403 rotationally connected with the bolts 1404; and a clamping face of the clamping block 1403 presents a corrugated shape fitting with the corrugated pipe 1401. Such a design makes a good fixing effect and a convenient angle adjustment of the corrugated pipe 1401, and in this embodiment, the rotating connection for the fixing ring 1402 and the support frame 1405 is a rotating connection way, through which the fixing ring 1402 and the support frame 1405 may be fixed after rotation in the prior art, therefore repetition is not made herein.

In one embodiment, the corrugated pipe 1401 may be detachably communicated with the main water inlet pipe orifices 801. Such a design may implement multiple and repeated sewage disposals after wetland spicing, thereby enhancing the disposing effect.

In one embodiment, upper and lower sides of the second material box 201 are respectively provided with a first flange 202 and a second flange 203 along a vertical direction, and the first flange 202 may be in sliding and sealing connection with the second material box 201 along a horizontal direction; and a first groove body 302 and a second groove body 102, which are in sealing and plugging fit with the first flange 202 and the second flange 203, are respectively arranged on the third material box 301 and the first material box 101, and the second groove body 102 may be in sliding and sealing connection with the first material box 101 along a horizontal direction. Such a design implements the sealing connection of various material boxes through plugging fit, and processes a good sealing good, a simple structure and a low manufacturing cost.

In one embodiment, two sides of the module frame 7 are also provided with a limiting chute 701 in respective along a vertical direction, threaded rods 9 are also rotationally arranged in the limiting chutes 701, each threaded rod 9 is also in threaded connection with two sliders 10, and the two sliders 10 are also slidingly connected with groove walls of the limiting chutes 701 in respective.

Left and right sides of the second material box 201 are also provided with a first chute 2011 in respective along a horizontal direction, first protrusions 204 capable of sliding in the two limiting chutes 701 are slidingly arranged in the two first chutes 2011 in respective, the first protrusions 204 may enable the threaded rods 9 and the sliders 10, located above, to pass, and the first protrusions 204 may also be propped to top ends of the sliders 10, located below.

Two sides of the third material box 301 are also provided with second protrusions 303 capable of sliding in the two limiting chutes 701 in respective, and the second protrusions 303 may enable the threaded rods 9 to pass and be propped to top ends of the sliders 10, located above. Such a design avoids a situation that the second material frame 201 is hard to slide along the horizontal direction due to a great frictional force between the second material box 201 and the third material box 301 and between the second material frame 201 and the first material box 101 when the wetland is blocked. In a specific using state, the threaded rods 9 and the sliders implement the combination of screw rods and nuts by rotating the threaded rods 9, so that the sliders 10 move along a vertical direction. The two sliders 10 lift the second material box 201 and the third material box 301 in respective, making a gap exist between the second material box 201 and the first material box 101 and between the second material box 201 and the third material box 301. At this time, the second material box 201 is convenient to pull, and the filling in the second material box 201 and the first material box 101 is convenient to clean. In this embodiment, the setting sliding between the limiting chutes 701 and the first protrusions 204 and between the limiting chutes 701 and the second protrusions 303 is convenient for the plugging fit between the first flange 202 and the second flange 203 and the first groove body 302 and the second groove body 102, and in this embodiment, the threaded rods 9 may be only arranged in one limiting chute 701.

In one embodiment, each first protrusion 204 includes a block body 2041, a sliding pole 2042 slidingly worn on the block body 2041 along a vertical direction, two inserting blocks 2043 slidingly worn on the block body 2041 along a horizontal direction in respective, a driving block 2044 arranged on the sliding pole 2042 and capable of controlling the two inserting blocks 2043 to slide synchronously along the same direction, and a spring 2045 wound on the sliding pole 2042 and capable of resetting the sliding pole 2042; and slots 7011 capable of being in plugging fit with the inserting blocks 2043 are formed in the groove walls of the first chutes 2011 and the limiting chutes 701 in respective, and the sliding pole 2042 may also be propped to the second protrusions 303. Such a design enables the first protrusions 204 to be fixed to the second material box 201 when the second material box 201 is not mounted on the module frame 7, which is convenient for the counterpoint installation of the first protrusions 204 and the limiting chutes 701. After the second material box 201 is not mounted on the module frame 7, the first protrusions 204 are fixed to the module frame 7, which is convenient for the second material box 201 to implement the sliding along the horizontal direction, and in a specific state, when the first protrusions 204 are fixed to the second material box 201, one inserting block 2043 is inserted into the slot 7011 of the second material box 201, the sliding pole 2042 is propped with the second protrusions 303 with the installation of the third material box 301 after the first protrusions 204 are fixed to the module frame 7, and the sliding pole 2042 is driven to slide, in order to drive the inserting block 2043 inserted into the slot 7011 of the second material box 201 to break away. The other inserting block 2043 is inserted into the slot 7011 in the module frame 7, the sliding pole 2042 resets through the spring 2045 after the installation of the third material box 301 is dismounted, so that the inserting block 2043 broken away from the slot 7011 in the second material box 201 is inserted again. In this embodiment, when the movement of the second material box 201 and the third material box 301 is achieved through the threaded rods 9, the second protrusions 303 are also propped with the first protrusions 204, and inserting the inserting blocks 2043 into the slots 7011 in the module frame 7 is implemented. To ensure this effect, a pressing block may be worn at bottoms of the second protrusions 303, the pressing block is connected with the second protrusions 303 through another spring, an elastic coefficient of this spring is greater than that of the spring 2045, and this spring will not affect the sealing plugging of the second flange 203 and the first groove body 302.

In one embodiment, a cross section of the driving block 2044 is a parallelogram, one side of each of the two inserting blocks 2043 is inclined and in contact with the two inclined faces of the driving block 2044 in respective, and the two inserting blocks 2043 are also slidingly hinged with the driving block 2044 in respective through a linkage 2046. Such a design implements the synchronous sliding effect by designing the simple inclined faces and the linkage 2046, and processes a smart structure and simple manufacturing.

In one embodiment, threads of the threaded rods 9 are distributed in two sections, and a thread pitch located above is greater than that located below. Such a design enables the third material box 301 to have a great move-up distance when the threaded rods 9 rotate and avoids the third material box 301 being adhered to the second material box 201 due to the gravity and the structure sinking, making the second material box 201 sink accordingly; and the free sliding of the second material box 201 along the horizontal direction can be implemented by rotating multiple turns of the threaded rods 9.

In one embodiment, an electric machine 11 with an output end connected with one threaded rod 9 is also arranged in the module frame 7, and both threaded rods 9 are provided with pulleys 12, between which a belt 13 is also connected. Such a design implements the synchronous rotation of the two threaded rods 9 by the fit of the electric machine 11, the pulleys 12 and the belt 13, so that the third material box 301 and the second material box 201 rise and fall stably.

In conclusion, the water-blocking air-permeable modular constructed wetland capable of aerating intermittently provided by the present disclosure has the following beneficial effects:

The aerobic reaction zone 1 is aerated and supplied with oxygen through the aeration pipe 4, such that the dissolved oxygen in the aerobic reaction zone 1 is sufficient. The clear aerobic reaction zone is formed to occur the nitration reaction and occur other reactions for removing the organic matters of other aerobic and heterotrophic bacteria, enhancing the effect of the nitration reaction provides the denitrification reaction with sufficient nitrogen source to occur the denitrification reaction, and the oxygen entry into the anoxic reaction zone 2 caused by the excess oxygen is prevented by controlling the aeration pipe 4 to aerate intermittently and controlling the aeration time, and the clear anoxic reaction zone 2 is formed, avoiding enhancing the denitrification reaction while inhibiting the denitrification reaction by the excess dissolved oxygen, thereby enhancing the nitrogen removal effect.

By setting the air-permeable water-blocking layer 5 and the air-insulating layer 6, the oxygen, clamped between the two layers and generated by the aeration pipe 4, and the sewage in the aerobic reaction zone are locked, which further enhances the nitration reaction of the sewage in the aerobic reaction zone 1 and other reactions for removing the organic matters.

The concentration of the nitrogen pollutant in the sewage is reduced by enhancing the nitration reaction, other reactions for removing the organic matters of other aerobic and heterotrophic bacteria and the denitrification reaction, so a situation that the plant root in the wetland is rot, caused by the higher concentration of the nitrogen pollutant in the sewage, is avoided, that is, the activity of the plant root is enhanced. Since the plant root may absorb and assimilate a part of nitrogen pollutant, the phosphorous removal effect is also enhanced.

The nitration reaction, denitrification reaction and plant purification are implemented orderly and in turn by setting the bottom-up water discharge, to ensure that each zone may be completely covered by the sewage for reaction, thereby improving the wetland utilization rate.

The detachable and convenient installation of the wetland device is implemented by the detachable connection of the first material box 101, the second material box 201, the third material box 301 and the module frame 7.

When the wetland is blocked, the second material box 201 and the first material box 301 are exposed outside by sliding the second material box 201 along the horizontal direction, in order to conveniently clean the filling inside therein.

It should be understood that the examples and implementation modes of the present disclosure are merely for description, not intended to limit the present disclosure. Those skilled in the art can make various modifications or changes, and any modifications, equivalent replacements, improvements and the like made within the spirit and principle of the present disclosure shall fall within the protection scope of the present disclosure.

What is claimed is:

1. A water-blocking air-permeable modular constructed wetland capable of aerating intermittently, comprising an aerobic reaction zone, an anoxic reaction zone, a soil plant zone and an aeration pipe, wherein the aerobic reaction zone, the anoxic reaction zone and the soil plant zone are communicated in turn along a bottom-up water discharging direction, the aerobic reaction zone comprises an air-permeable water-blocking layer and an air-insulating layer that are arranged at interval from inside to outside, and an aeration port of the aeration pipe is located in a cavity, enclosed by the air-permeable water-blocking layer and the air-insulating layer; and further comprising a module frame and a water inlet pipe worn on the module frame, wherein the aerobic reaction zone further comprises a first material box which is arranged at an interval with the module frame and communicated with the water inlet pipe, the aeration pipe is worn on the module frame and the aeration port is located at a gap position between the module frame and the first material box, the air-permeable water-blocking layer is arranged on the first material box, and the air-insulating layer is arranged on the module frame.

2. The water-blocking air-permeable modular constructed wetland capable of aerating intermittently according to claim 1, wherein the anoxic reaction zone at least comprises a second material box, the soil plant zone at least comprises a third material box, both the second material box and the third material box are capable of being detachably connected with the module frame along a vertical direction, and the second material box is capable of being in sliding and sealing connection with the first material box and the third material box along a horizontal direction.

3. The water-blocking air-permeable modular constructed wetland capable of aerating intermittently according to claim 2, wherein the water inlet pipe is provided with at least four main water inlet pipe orifices, all of which are uniformly worn on four sides of the module frame.

4. The water-blocking air-permeable modular constructed wetland capable of aerating intermittently according to claim 2, wherein the aeration pipe is provided with at least four main air inlet pipe orifices, all of which are uniformly worn on the four sides of the module frame.

5. The water-blocking air-permeable modular constructed wetland capable of aerating intermittently according to claim 2, wherein upper and lower sides of the second material box are respectively provided with a first flange and a second flange along a vertical direction, and the first flange is capable of being in sliding and sealing connection with the second material box along a horizontal direction; and a first groove body and a second groove body, which are in sealing and plugging fit with the first flange and the second flange, are respectively arranged on the third material box and the first material box, and the second groove body is capable of being in sliding and sealing connection with the first material box along a horizontal direction.

6. The water-blocking air-permeable modular constructed wetland capable of aerating intermittently according to claim 5, wherein two sides of the module frame are also provided with a limiting chute in respective along a vertical direction, threaded rods are also rotationally arranged in the limiting chutes, each threaded rod is also in threaded connection with two sliders, and the two sliders are also slidingly connected with groove walls of the limiting chutes in respective;

left and right sides of the second material box are also provided with a first chute in respective along a horizontal direction, first protrusions capable of sliding in the two limiting chutes are slidingly arranged in the two first chutes in respective, the first protrusions enable the threaded rods and the sliders, located above, to pass, and the first protrusions are also propped to top ends of the sliders, located below; and two sides of the third material box are also provided with second protrusions capable of sliding in the two limiting chutes in respective, and the second protrusions enable the threaded rods to pass and are propped to top ends of the sliders, located above.

7. The water-blocking air-permeable modular constructed wetland capable of aerating intermittently according to claim 6, wherein each first protrusion comprises a block body, a sliding pole slidingly worn on the block body along a vertical direction, two inserting blocks slidingly worn on the block body along a horizontal direction in respective, a driving block arranged on the sliding pole and capable of controlling the two inserting blocks to slide synchronously along a same direction, and a spring wound on the sliding pole and capable of resetting the sliding pole; and slots capable of being in plugging fit with the inserting blocks are formed in the groove walls of the first chutes and the limiting chutes in respective, and the sliding pole is capable of being also propped to the second protrusions.

8. The water-blocking air-permeable modular constructed wetland capable of aerating intermittently according to claim 7, wherein a cross section of the driving block is a parallelogram, one side of each of the two inserting blocks is inclined and in contact with two inclined faces of the driving block in respective, and the two inserting blocks are also slidingly hinged with the driving block in respective through a linkage.

9. The water-blocking air-permeable modular constructed wetland capable of aerating intermittently according to claim 7, wherein an electric machine with an output end connected with one threaded rod is also arranged in the module frame, and both threaded rods are provided with pulleys, between which a belt is also connected.

* * * * *